United States Patent
Joern et al.

(10) Patent No.: US 7,919,030 B2
(45) Date of Patent: Apr. 5, 2011

(54) METHOD FOR PRODUCING SINGLE- OR MULTI-LAYERED FIBER PREFORMS BY THE TFP PROCESS AS WELL AS A FIXING THREAD AND BACKING LAYER

(75) Inventors: Paul Joern, Hamburg (DE); Ulrich Eberth, Rain (DE)

(73) Assignee: Airbus Operations GmbH, Hamburg (DE)

( * ) Notice: Subject to any disclaimer, the term of this patent is extended or adjusted under 35 U.S.C. 154(b) by 1 day.

(21) Appl. No.: 11/989,251

(22) PCT Filed: Jul. 24, 2006

(86) PCT No.: PCT/EP2006/064572
§ 371 (c)(1),
(2), (4) Date: Sep. 15, 2008

(87) PCT Pub. No.: WO2007/010051
PCT Pub. Date: Jan. 25, 2007

(65) Prior Publication Data
US 2009/0096119 A1    Apr. 16, 2009

(30) Foreign Application Priority Data
Jul. 22, 2005    (DE) .......................... 10 2005 034 401

(51) Int. Cl.
*D01F 9/12*    (2006.01)
(52) U.S. Cl. ........................................ 264/257
(58) Field of Classification Search ............... 264/257
See application file for complete search history.

(56) References Cited

U.S. PATENT DOCUMENTS

| 5,100,722 A | * | 3/1992 | Nakamura et al. ............. 442/233 |
| 5,248,393 A | * | 9/1993 | Schumacher et al. ........ 202/158 |
| 5,401,557 A | * | 3/1995 | Inomata et al. ............... 428/110 |

(Continued)

FOREIGN PATENT DOCUMENTS

DE    20 2004 017 762 U1    2/2005

OTHER PUBLICATIONS

Summary of Solvron Yarn <url:http://www.nitivy.co.jp/english/summary.html>.*

(Continued)

*Primary Examiner* — Christina Johnson
*Assistant Examiner* — Xue Liu
(74) *Attorney, Agent, or Firm* — Greer, Burns & Crain, Ltd.

(57) ABSTRACT

Disclosed is a method for producing single- or multi-layered fiber performs by the TFP process with fiber strands which are aligned substantially such that they are oriented with the flux of force, are laid on at least one backing layer and are attached by at least one fixing thread. After completion of the TFP process, at least one fiber preform is introduced into a fixing device to secure the position of the fiber strands and the fixing threads and/or the backing layers are at least partially removed. As a result of the preferably complete removal of the fixing threads and/or the backing layer from the fiber preform, the latter has virtually ideal mechanical, quasi isotropic properties. In a preferred variant, the fixing threads and/or the backing layers are formed by a water-soluble material, so that they can be completely dissolved by water as the solvent and flushed out.

2 Claims, 1 Drawing Sheet

U.S. PATENT DOCUMENTS

| | | |
|---|---|---|
| 5,439,627 A | 8/1995 | De Jager |
| 6,319,348 B1 | 11/2001 | Olry et al. |
| 6,837,952 B1 | 1/2005 | Guirman et al. |
| 2003/0132543 A1 | 7/2003 | Gardner |
| 2004/0045428 A1* | 3/2004 | Citerrio ................. 89/36.05 |
| 2005/0058819 A1* | 3/2005 | Wagener et al. ........... 428/292.1 |

OTHER PUBLICATIONS

"Erlauterungen zur TFP-Technologie", www.hightex-dresden.de/tfptech Internet Citation. Mar. 7, 2005. PDF dated Sep. 27, 2006.

* cited by examiner

METHOD FOR PRODUCING SINGLE- OR MULTI-LAYERED FIBER PREFORMS BY THE TFP PROCESS AS WELL AS A FIXING THREAD AND BACKING LAYER

FIELD OF THE INVENTION

The invention relates to a method for producing single- or multi-layered fiber preforms by the TFP process ("Tailored Fiber Placement") with fiber strands which are aligned substantially such that they are oriented with the flux of force, are laid on at least one backing layer and are attached by at least one fixing thread, the fiber preform having virtually any desired material thickness.

The invention also relates to a fixing thread as well as to a backing layer for carrying out the method.

BACKGROUND OF THE INVENTION

In lightweight construction, in particular in aircraft construction, use is increasingly being made of composite components made of fiber-reinforced plastics, which can withstand extreme mechanical loads and at the same time offer a high weight-saving potential. These components are formed with reinforcing fibers which are subsequently saturated or impregnated with a curable polymer material, for example a polyester resin, an epoxy resin or the like, to form the finished component.

The alignment of the reinforcing fibers in a component of this type has a decisive influence on its rigidity and strength. To achieve optimum mechanical properties, the reinforcing fibers should, if possible, follow the direction of loading and not have any wave formation. In addition, it is desirable for each individual reinforcing fiber to be subjected to uniform loading.

With conventional semifinished products, such as, for example, woven or laid fiber fabrics, for reinforcement of the polymer material, not all conceivable fiber orientations can be realized, since the reinforcing fibers are generally arranged there in a specific, fixed orientation. Although laid fiber fabrics can be "draped", that is to say laid in a planar manner without creasing, for example to form segments of a circular ring, the reinforcing fibers generally cannot bring themselves into line with the path followed by more complex lines of force flux.

One possible way of complying with a requirement for fiber alignment in accordance with loading is the known TFP process. This involves the laying of fiber strands for mechanical reinforcement ("rovings"), which are in turn formed by a multiplicity of discrete reinforcing fibers running parallel to one another, along any desired path curve and attaching them with the aid of a fixing thread on a backing layer to form a fiber preform ("preform"), whereby the alignment of the individual fiber strands can be adapted virtually optimally to the forces acting on the finished composite component. The fixing is performed here by an upper fixing thread and a lower fixing thread, which are interlinked with one another underneath the backing layer—in a way corresponding to conventional sewing methods. The attachment of the fiber strands is preferably performed here with zigzag stitches. The optimum utilization of the mechanical load-bearing capacity of the fiber strands that is achieved in this way can minimize their number, and consequently also the weight. Moreover, the cross section of the component can be adapted in an ideal way to the respective local loads. Furthermore, reinforcements can be formed specifically in zones that are subjected to particular loading, such as, for example, regions where force is introduced or the like, by laying additional fiber strands. The discrete reinforcing fibers are formed, for example, by glass fibers, carbon fibers, aramid fibers or the like.

The production of fiber preforms by means of the TFP process is performed on customary CNC-controlled automatic sewing and embroidering machines, which are also used, for example, in the textile industry. Once all the required layers have been laid with fiber strands, the finished fiber preform, which generally already has the desired final contour, is placed in a closable mould, and impregnated with a curable polymer material and subsequently cured to form the finished composite component. A number of TFP fiber preforms and/or layers of reinforcing fabrics may be combined here. Multi-layered fiber preforms are formed by placing a number of (single, single-layered) fiber preforms one on top of the other, so as to be able to create greater material thicknesses that could not otherwise be produced on account of the limited needle length in the automatic sewing or embroidering machines that are used for the TFP process. Multi-layered fiber preforms accordingly have at least two backing layers, running approximately parallel to one another within the multi-layered fiber preform.

The impregnation of the fiber preforms with the curable polymer material may be performed, for example, by means of the known RTM process ("Resin Transfer Moulding") in a correspondingly designed closable mould.

However, with the fixing thread and the backing layer, the TFP process introduces into the fiber preform two elements that no longer perform any function in the later composite component, in particular no backing function. Rather, both the backing layer and the fixing threads cause problems in realizing an ideal sequence of layers and, moreover, represent a not insignificant proportion of the overall weight, in particular if a number of fiber preforms are placed one on top of the other or single-layered fiber preforms of great material thickness are formed by a multiplicity of fiber strands lying one on top of the other. Although the backing layer itself may also be formed by a woven reinforcing fabric, for example by a woven glass- or carbon-fiber fabric, even in this case at least some of the reinforcing fibers have an alignment that is not in accordance with the loading. Moreover, the woven reinforcing fabric is also impaired by the penetration with the sewing needle during the TFT process, so that the characteristic material values may be impaired. In order to avoid the difficulties mentioned, the fixing threads may be formed, for example, by readily meltable material, but this results in an undefined amount of material entering the fiber preform, which may impair the mechanical properties of the matrix formed by means of impregnation with a curable polymer material in the later composite component.

SUMMARY OF THE INVENTION

It is one of the objects of the invention to provide a method by which single- or multi-layered fiber preforms of virtually any desired material thickness can be created without the disturbing influence of the fixing thread that is generally necessary for the TFT process and/or the generally required backing layer.

Accordingly, a method for producing single- or multi-layered fiber preforms by the TFP process with fiber strands which are aligned substantially such that they are oriented with the flux of force, comprises the steps that:

a) to form a fiber preform, the fiber strands are laid on a backing layer and are attached by a fixing thread, at least one of the fixing thread and the backing layer being formed by a water-soluble material, and the fiber preform having virtually any desired material thickness, b) after completion of the TFT process, at least one fiber preform is introduced into a fixing device to secure the position of the fiber strands within the at least one fiber preform, c) the fixing device is flowed through by water as the solvent, in order to remove said at least one of the fixing thread and the backing layer by dissolving and flushing out, the water being conducted through the fixing device in a closed circuit by way of an inflow and an outflow and filtered, d) after the removal of said at least one of the fixing thread and the backing layer, the at least one fiber preform is dried in the fixing device by heat being supplied, and e) the impregnation of the at least one fiber preform is performed in the fixing device in accordance with the RTM process with an epoxy resin to produce the finished composite component.

The fact that, after completion of the TFT process, at least one fiber preform is introduced into a fixing device to secure the position of the fiber strands within the fiber preform and that the fixing thread or the fixing threads and/or the backing layer or the backing layers is/are at least partially removed makes it possible by means of the method according to the invention that, in the ideal case, all the fixing threads and backing layers that no longer perform any function in the later composite component can be removed from the fiber preform. As a result, the fiber preform produced by the method according to the invention has virtually ideal, "quasi isotropic" chemical properties. In particular, flaws in the fiber preform as a result of imperfect sewing of the fiber strands with the fixing threads, which may lead to wavy fiber threads etc., and inhomogeneities in the fiber preform due to formations of knots and loops between the upper fixing thread and the lower fixing thread, are avoided. The removal of backing layers has a correspondingly advantageous effect, since they represent regions of preferential delamination in the later composite component. In addition, the removal of the fixing thread and the backing layer produces a considerable weight saving. The aforementioned advantageous effects come even more to the fore in the case of multi-layered fiber preforms in particular. The fixing device is preferably formed in such a way that it reliably secures the layer of the fiber strands in relation to one another during the removal of the fixing threads and/or the backing layers and at the same time gives the fiber preform a geometrical shape that corresponds as exactly as possible to the composite component that is to be produced later from the fiber preform by means of resin impregnation.

According to one embodiment of the method according to the invention, the fixing thread or the fixing threads and/or the backing layer or the backing layers is/are formed by a material which can be chemically and/or physically removed, in particular a material which can be dissolved. As a result, both the fixing thread and the backing layers can be removed or dissolved from the fiber preform in a simple way.

According to a further embodiment, it is provided that the fixing thread or the fixing threads and/or the backing layer or the backing layers is/are removed by dissolving and flushing out, the fixing device being flowed through by a solvent, in particular water as the solvent. The removal of the fixing threads and/or the backing layer in the case of a single-layered fiber preform or the backing layers in the case of a multi-layered fiber preform by dissolving the fixing thread and backing layer material with a suitable solvent, in particular with water, and the subsequent flushing out of the dissolved fixing thread and backing layer material allows virtually complete removal of the fixing threads and/or the backing layer or the backing layers. Here, water in particular as the solvent has the advantage that interaction with the reinforcing fibers in the fiber preform that may lead to impairment of the mechanical properties does not generally occur. In particular, water as the solvent does not substantially influence the properties of the size that is usually applied to the reinforcing fibers to improve the bonding of the reinforcing fibers to the resin matrix. In addition, water as the solvent can be driven out from the fiber preform quickly, and in particular without any being left behind, by heat being supplied. Furthermore, water as the solvent can be handled easily and safely. With preference, the fixing thread or the fixing threads and/or the backing layer or the backing layers is/are formed by a water-soluble polymer material. The threads with the designation SOLVRON® Sewing Thread SX 100T/1×3 and SOLVRON® SF62dtex from the company NITIVY Co. LTD. Tokyo, Japan, may be used, for example, as water-soluble fixing threads. If, on the other hand, the fixing threads and/or the backing layers are formed by a water-insoluble material, it is required to use alternative solvents instead of water.

In accordance with a further embodiment of the method according to the invention, the fiber preform is dried in the fixing device by heat being supplied after the removal of the fixing thread or the fixing threads and/or the removal of the backing layer or the backing layers. As a result, the solvent that is used for dissolving and flushing out the fixing threads and/or the backing layers can preferably be removed completely from the fiber preform, so that impairment of the properties of the fiber preform is largely ruled out.

In accordance with a further embodiment of the method, the impregnation of the fiber preform is performed in the fixing device with a curable polymer material, in particular in accordance with the RTM process with an epoxy resin, with a polyester resin or the like, to produce the finished composite component. As a result, the fixing device can be used in an advantageous way at the same time as a closable mould for producing the finished composite component by means of the RTM process. This is of advantage in particular because the closable moulds that are used for the RTM process generally also have a heating device, which can consequently be used at the same time for drying the fiber preform. Furthermore, the moulds that are used for the RTM process additionally have a vacuum device, with which the drying process can be speeded up.

A further embodiment of the method according to the invention provides that at least two fiber preforms are arranged in the fixing device for the forming of a multi-layered fiber preform. As a result of the arrangement of a number of (single, single-ply, single-layered) fiber preforms, so-called multi-layered fiber preforms can be formed with a greater material thickness. These multi-layered fiber preforms accordingly have a number of backing layers and a number of fixing threads.

The fact that the fixing thread is formed by a material which can be chemically and/or physically removed, in particular by a water-soluble material, means that it is possible in a simple way for it to be removed preferably completely from the fiber preform. With preference, the fixing thread is formed by a readily water-soluble polymer material. The threads with the designation SOLVRON® Sewing Thread SX 100T/1×3 and SOLVRON® SF62dtex from the company NITIVY Co. LTD. Tokyo, Japan may be used, for example, as water-soluble fixing threads.

The fact that the backing layer is formed by a material which can be chemically and/or physically removed, in particular by a water-soluble material, means that it is possible in a simple way to remove it completely from the fiber preform. In a particularly preferred variant, the backing layer or the backing layers is/are formed by a readily water-soluble polymer material. The threads SOLVRON® Sewing Thread SX 100 T/1×3 and SOLVRON® SF 62dtex from the company NITIVY Co. LTD. Tokyo, Japan can likewise be used for forming the backing layer.

DETAILED DESCRIPTION OF THE INVENTION

The method according to the invention is to be explained in more detail below on the basis of FIG. 1 and FIG. 2.

Figure 1:
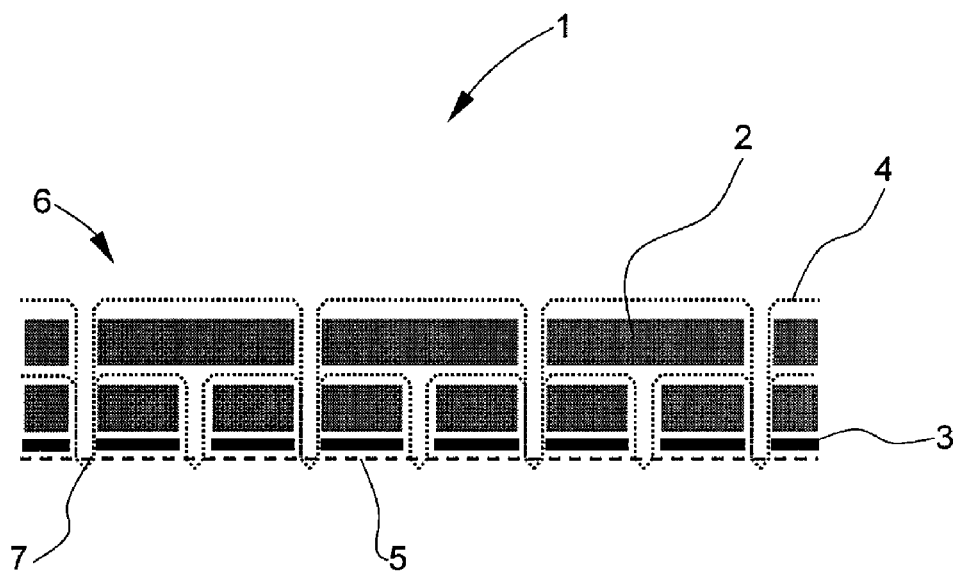
FIG. 1 shows a schematic cross sectional representation through a single-layered fiber preform and FIG. 2 shows a schematic cross-sectional representation through a multi-layered fiber preform, in which the fixing threads and the backing layers have been flushed out completely by means of the method according to the invention.

FIG. 1 shows a schematic cross-sectional representation of the basic construction of a single-layered fiber preform 1. The fiber preform 1 has a multiplicity of fiber strands 2, only one of which has been provided with a reference numeral as representative of the others. The fiber strands are in turn formed by a multiplicity of reinforcing fibers, which are likewise not designated any more specifically and run substantially perpendicularly in relation to the plane of the drawing. Glass fibers, carbon fibers or aramid fibers come into consideration, for example, as reinforcing fibers.

In a first method step, the fiber strands are first laid by means of the known TFP process ("Tailored Fiber Placement") on a backing layer 3, preferably such that they are oriented with the flux of force, and attached by an upper fixing thread 4 and a lower fixing thread 5 as fixing threads 6. The upper fixing thread 4 forms loops underneath the backing layer 3, only one of which has been provided with a reference numeral, as loop 7, for the sake of better overall clarity of the drawing. The lower fixing thread 5 runs through all the loops, including the loop 7, so that all the fiber strands are attached on the backing layer for securement against displacements. The laying and attaching of the fiber strands is performed here by known CNC automatic sewing or embroidering machines, with which virtually any desired laying curves of the fiber strands on the backing layer 3 can be formed. The guidance of the fiber strands to be laid and their attachment on the backing layer 3 are performed by means of a sewing head, which is not represented, is computer-controlled in at least two spatial dimensions and can be positioned by the automatic sewing or embroidering machine.

Alternatively, the fiber preform 1 may also be laid and stitched together by means of the so-called "tufting" process. In this case, only an upper fixing thread 4 is used, and is fixed directly in a suitably chosen backing layer 3 by being clamped in. The lower fixing thread 5, for fixing the upper fixing thread 4 underneath the backing layer 3 by interlinking or loop formation with the upper fixing thread 4, and lower fixing thread guidance are consequently superfluous. A flexible and elastic rubber sheet, a foam plastic or the like, in which the upper fixing thread 4 is at least superficially introduced by the needle, is used, for example, as the backing layer 3. The upper fixing thread loops that form in the rubber sheet after the withdrawal of the needle are firmly held within the rubber sheet and are consequently fixed.

This procedure has the advantage in particular that the backing layer 3 does not have to be dissolved by means of the method according to the invention, since it can be detached from the fiber preform 1 in the fixing device without any appreciable damage to the reinforcing fibers before the dissolving and flushing out of the fixing threads 6.

By placing a number of fiber preforms 1 one on top of the other in accordance with the representation in FIG. 1, it is also possible if required for so-called multi-layered fiber preforms to be formed for the production of composite components with a greater material thickness that could not otherwise be produced by the TFP process on account of the limited needle length.

The fiber preform 1 is built up with a number of layers by means of the TFP process at least with dissolvable fixing fibers 6, that is to say in particular with a dissolvable upper fixing fiber 4 and a dissolvable lower fixing fiber 5, on the backing layer 3. In addition, it is possible also to use such a material that can be removed by dissolving for the forming of the backing layer 3. Coming into consideration in particular in this connection are water-soluble materials, which make it easily possible for the material of the dissolved fixing fibers 6 and/or of the backing layer 3 to be flushed out with water, and moreover dried quickly, without any being left behind, by heat being supplied. Furthermore, water as the solvent has the advantage that impairment of the properties of the reinforcing fibers in the fiber strands generally does not occur. In particular, the size that is usually applied to the reinforcing fibers to improve the mechanical bonding of the reinforcing fibers to the surrounding resin matrix of the later finished composite component is not attacked.

Figure 2:
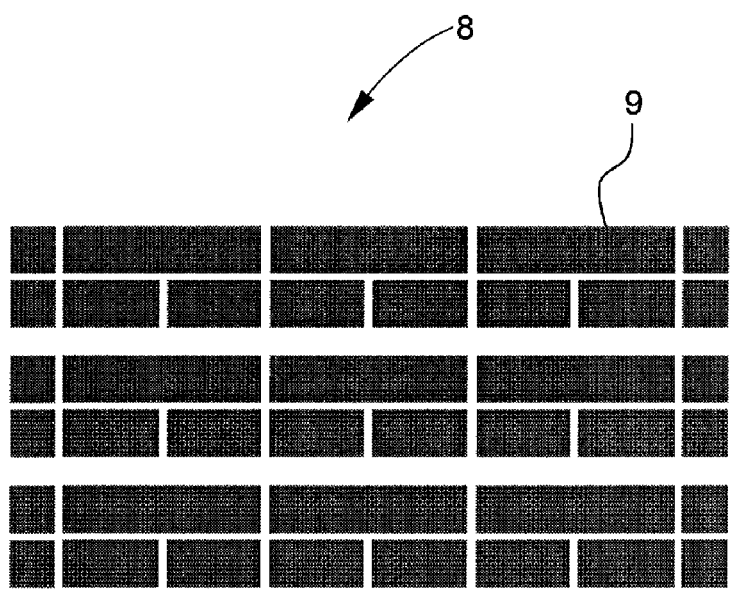

FIG. 2 shows a schematic cross-sectional representation through a multi-layered fiber preform 8, in which both the fixing threads and the backing layers have been completely removed in a suitable fixing device in a second method step. The removal of the fixing threads and the backing layers is performed by dissolving the fixing threads and the backing layers by means of a suitable solvent and the subsequent, preferably complete flushing out of the dissolved fixing thread and backing layer material with the solvent.

The distances between the fiber strands in FIG. 2 are exaggerated for reasons of better overall clarity of the drawing. The fixing threads run in the narrow vertical and horizontal intermediate spaces, while the backing layers have been arranged in the wide horizontal intermediate spaces. In reality, the fiber strands lie directly against one another, substantially without any gaps, after the removal of the fixing threads and/or the backing layers by dissolving and flushing out, so that a very high proportion of fibers by volume of 50% and more is obtained in the later composite component. From the multiplicity of fiber strands, only one fiber strand 9 has been picked out and provided with a reference numeral, as representative of the remaining fiber strands, for the sake of a better overview of the drawing.

The fiber preform 8 is built up in a multi-layered form, that is to say from a total of three fiber preforms respectively built up in accordance with the fiber preform 1 and arranged one on top of the other, with in each case two layers of fiber strands with reinforcing fibers, all the fixing threads and backing layers having been eliminated by flushing out with the solvent.

As a result, the fiber preform 8 has virtually optimum mechanical, quasi isotropic properties. In particular, there are no wave formations of the fiber strands, generally produced by attaching the same on the backing layers by means of the fixing threads. Furthermore, flaws in the fiber arrangement of the fiber preform 8 are completely eliminated by the flushing out, since the knots and loops formed between the upper fixing threads and the lower fixing threads, as well as the backing layers, are simply dissolved.

To make it possible for the fixing threads and/or the backing layers to be dissolved and flushed out completely, they are preferably produced with materials which can easily be chemically and/or physically removed, in particular with polymer materials or the like which can be easily and quickly dissolved and flushed out by suitable solvents. Water-soluble polymer materials, which allow the use of water as the solvent, are used with preference for forming the fixing threads and/or the backing layers. For example, threads with the designation SOLVRON® Sewing Thread SX 100T/1×3 and SOLVRON® SF62dtex from the company NITIVY Co. LTD. Tokyo, Japan may be used as water-soluble fixing threads.

Alternatively, other solvents, such as, for example, organic solvents, chlorinated hydrocarbons and the like, may also be used, depending on the material used for the fixing threads and/or the backing layer.

The dissolving and subsequent flushing out of the fixing threads and/or the backing layers is/are performed in a fixing device not represented any more specifically. A fixing device serves on the one hand for the purpose of substantially maintaining the form of the fiber preform 8 during the flushing-out process, and consequently avoiding displacements of the fiber strands. On the other hand, the fixing device has the task of ensuring a solvent flow that is as uniform as possible and permeates all regions of the fiber preform.

To make the dissolving and flushing out of the fiber threads and/or the backing layers possible, the fixing device has, for example, at least one inflow and at least one outflow for the water that is used with preference as the solvent. The solvent may also be conducted here in a closed circuit, which generally requires filtering out of the dissolved material particles of the fixing threads and/or of the backing layer. To avoid foreign matter, in particular in the form of dissolved minerals or the like, entering the fiber preform 8, it may be necessary to use distilled water as the solvent.

For the subsequent drying of the fiber preform 8 in a third method step, it remains in a particular advantageous way in the fixing device, which is then heated by means of a heating device for drying the fiber preform 8. By means of the heating device, water that is used, for example, as the solvent can be driven out completely from the fiber preform 8. To speed up the drying process further, a negative pressure may be additionally applied to the fixing device.

In a fourth method step, the fiber preform 8 dried in this way is impregnated or saturated with a curable polymer material, for example an epoxy resin, a polyester resin, a BMI resin or the like, for example by means of the known RTM process ("Resin Moulding Transfer"), to produce a finished composite component. In a particularly preferred way, this method step is also performed within the fixing device, which then serves or is formed at the same time within the RTM process as a closable mould, so that, inter alia, undefined deformations of the fiber preform 8 that could impair the dimensional stability of the finished composite component are largely avoided.

This procedure additionally has in particular the advantageous effect that the closable moulds for carrying out the RTM process usually have a heating device, which can be used at the same time for drying the fiber preform 8 after the flushing out in the third method step. In a corresponding way, a vacuum device that is generally present when carrying out the RTM process can also serve for further speeding up the process of drying the fiber preform 8.

Composite components which are produced with a fiber preform formed in accordance with the method according to the invention have virtually optimum alignment of the reinforcing fibers, that is to say in particular oriented substantially with the flux of force, without flaws in the form of knots and loops and wave formations, and are consequently to be considered "quasi isotropic" with regard to their physical properties. Moreover, the composite components may be produced with virtually any desired material thicknesses, without any troublesome backing layers.

The invention accordingly relates to a method for producing single- or multi-layered fiber preforms 1, 8 by the TFP process with fiber strands 2, 9 which are aligned substantially such that they are oriented with the flux of force, are laid on at least one backing layer 3 and are attached by at least one fixing thread 6, the fiber preform 1, 8 having virtually any desired material thickness, wherein, after completion of the TFT process, at least one fiber preform 1, 8 is introduced into a fixing device to secure the position of the fiber strands 2, 9 within the fiber preform 1, 8 and the fixing thread 6 or the fixing threads 6 and/or the backing layer 3 or the backing layers 3 is/are at least partially removed.

The fixing thread 6 or the fixing threads 6 and/or the backing layer 3 or the backing layers 3 is/are formed by a material which can be chemically and/or physically removed, in particular a material which can be dissolved.

The fixing thread 6 or the fixing threads 6 and/or the backing layer 3 or the backing layers 3 is/are removed by dissolving and flushing out, the fixing device being flowed through by a solvent, in particular water as the solvent.

The fiber preform 1, 8 is advantageously dried in the fixing device by heat being supplied after the removal of the fixing thread 6 or the fixing threads 6 and/or the removal of the backing layer 3 or the backing layers 3.

The impregnation of the fiber preform 1, 8 is performed in the fixing device with a curable polymer material, in particular in accordance with the RTM process with an epoxy resin, with a polyester resin or the like, to produce the finished composite component.

At least two fiber preforms 1, 8 are arranged in the fixing device for the forming of a multi-layered fiber preform.

The fixing thread is advantageously formed by a material which can be chemically and/or physically removed, in particular by a water-soluble polymer material.

The backing layer is formed in particular by a material which can be chemically and/or physically removed, in particular by a water-soluble polymer material.

What is claimed is:

1. A method for producing single- or multi-layered fiber preforms by the TFP process with fiber strands which are aligned substantially such that they are oriented with the flux of force, comprising the steps of:
  a) to form a fiber preform, the fiber strands are laid on a backing layer and are attached to the backing layer by a fixing thread, the fixing thread either comprising upper and lower threads, the upper thread forming loops underneath the backing layer through which the lower threads run, or comprising an upper thread which is clamped in the backing layer, at least one of the fixing thread and the backing layer being formed by a water-soluble material, and the fiber preform having virtually any desired material thickness,
  b) after completion of the TFP process, at least one fiber preform is introduced into a fixing device to secure the position of the fiber strands within the at least one fiber preform, c) passing water as the solvent through the fixing device in a closed circuit, in order to remove said at least one of the fixing thread and the backing layer by dissolving and flushing out, the water being conducted through the fixing device by way of an in-flow and an outflow, d) filtering the water passing through the fixing device in the closed circuit e) after the removal of said at least one of the fixing thread and the backing layer, the at least one fiber preform is dried in the fixing device by heat being supplied, and f) the impregnation of the at least one fiber preform is performed in the fixing device in accordance with the RTM process with an epoxy resin to produce the finished composite component.

2. The method according to claim 1, wherein at least two fiber preforms are arranged in the fixing device for the forming of a multi-layered fiber pre-form.

\* \* \* \* \*